US012243273B2

(12) United States Patent
Lv et al.

(10) Patent No.: US 12,243,273 B2
(45) Date of Patent: Mar. 4, 2025

(54) NEURAL 3D VIDEO SYNTHESIS

(71) Applicant: META PLATFORMS TECHNOLOGIES, LLC, Menlo Park, CA (US)

(72) Inventors: Zhaoyang Lv, Redmond, WA (US); Miroslava Slavcheva, Seattle, WA (US); Tianye Li, Los Angeles, CA (US); Michael Zollhoefer, Pittsburgh, PA (US); Simon Gareth Green, Deptford (GB); Tanner Schmidt, Seattle, WA (US); Michael Goesele, Woodinville, WA (US); Steven John Lovegrove, Woodinville, WA (US); Christoph Lassner, San Francisco, CA (US); Changil Kim, Seattle, WA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 481 days.

(21) Appl. No.: 17/571,285

(22) Filed: Jan. 7, 2022

(65) Prior Publication Data

US 2022/0239844 A1 Jul. 28, 2022

Related U.S. Application Data

(60) Provisional application No. 63/142,234, filed on Jan. 27, 2021.

(51) Int. Cl.
G06T 7/00 (2017.01)
(52) U.S. Cl.
CPC ...... *G06T 7/97* (2017.01); *G06T 2207/20081* (2013.01); *G06T 2207/20084* (2013.01)

(58) Field of Classification Search
CPC .......... G06N 3/045; G06N 3/084; G06N 3/08; G06N 20/00; G06N 3/049; G06N 3/02;
(Continued)

(56) References Cited

U.S. PATENT DOCUMENTS 7,151,545 B2 12/2006 Spicer
11,546,568 B1 1/2023 Yoon et al.
(Continued)

FOREIGN PATENT DOCUMENTS

WO WO-2020242170 A1 * 12/2020

OTHER PUBLICATIONS

Wang Z., et al., "Image Quality Assessment: From Error Visibility to Structural Similarity," IEEE Transactions on Image Processing, Apr. 4, 2004, vol. 13 (4), pp. 1-14.
(Continued)

*Primary Examiner* — Henok Shiferaw
*Assistant Examiner* — Woo C Rhim
(74) *Attorney, Agent, or Firm* — Morgan, Lewis & Bockius LLP

(57) ABSTRACT

In one embodiment, a method includes initializing latent codes respectively associated with times associated with frames in a training video of a scene captured by a camera. For each of the frames, a system (1) generates rendered pixel values for a set of pixels in the frame by querying NeRF using the latent code associated with the frame, a camera viewpoint associated with the frame, and ray directions associated with the set of pixels, and (2) updates the latent code associated with the frame and the NeRF based on comparisons between the rendered pixel values and original pixel values for the set of pixels. Once trained, the system renders output frames for an output video of the scene, wherein each output frame is rendered by querying the
(Continued)

updated NeRF using one of the updated latent codes corresponding to a desired time associated with the output frame.

17 Claims, 8 Drawing Sheets
(3 of 8 Drawing Sheet(s) Filed in Color)

(58) Field of Classification Search
CPC . G06T 2207/20084; G06T 2207/20081; G06T 15/06; G06T 2207/10016; G06T 17/00; G06T 15/08; G06T 15/205; G06T 5/60; G06T 7/70; G06T 2207/20221; G06T 9/002; G06T 2200/04; G06T 2200/08; G06T 7/97; G06T 13/00; G06V 10/82; H04N 13/117; H04N 13/111; H04N 19/31; H04N 19/33
See application file for complete search history.

(56) References Cited

U.S. PATENT DOCUMENTS

| | | | |
|---|---|---|---|
| 2018/0189667 A1 | 7/2018 | Tsou et al. | |
| 2022/0189104 A1* | 6/2022 | Wetzstein | G06N 3/08 |
| 2022/0198731 A1* | 6/2022 | Lombardi | G06T 7/73 |
| 2022/0198738 A1* | 6/2022 | Xu | G06N 3/08 |
| 2022/0222897 A1 | 7/2022 | Yang et al. | |
| 2022/0245910 A1* | 8/2022 | Lombardi | G06T 15/06 |
| 2022/0301241 A1 | 9/2022 | Kim et al. | |
| 2022/0301257 A1 | 9/2022 | Garbin et al. | |
| 2022/0343522 A1 | 10/2022 | Bi et al. | |
| 2023/0116250 A1* | 4/2023 | Kowalski | G06T 15/06 |
| | | | 345/419 |
| 2023/0230275 A1* | 7/2023 | Lin | G06T 7/70 |
| | | | 382/103 |
| 2023/0306655 A1* | 9/2023 | Duckworth | G06T 15/20 |
| 2023/0360372 A1* | 11/2023 | Zhao | G06V 10/761 |
| 2024/0005590 A1* | 1/2024 | Martin Brualla | G06T 15/04 |

OTHER PUBLICATIONS

Wiegand T., et al., "Overview of the H.264/AVC Video Coding Standard," IEEE Transactions on Circuits and Systems for Video Technology, 2003, vol. 13, No. 7, pp. 560-576.
Wiles O., et al., "SynSin: End-to-End View Synthesis From a Single Image," Computer Vision and Pattern Recognition (CVPR), 2020, pp. 7467-7477.
Wood D.N., et al., "Surface Light Fields for 3D Photography," Proceedings of the 27th Annual Conference on Computer Graphics and Interactive Techniques, 2000, pp. 287-296.
Xian W., et al., "Space-time Neural Irradiance Fields for Free-Viewpoint Video," arXiv:2011.12950, 2020, 10 pages.
Xiao L., et al., "Neural Supersampling for Real-time Rendering," ACM Trans. Graph., vol. 39, No. 4, Jul. 8, 2020, pp. 142:1-142:12.
Xu R., et al., "Deep Flow-Guided Video Inpainting," Computer Vision and Pattern Recognition (CVPR), 2019, pp. 3723-3732.
Yao Y., et al., "MVSNet: Depth Inference for Unstructured Multi-view Stereo," European Conference on Computer Vision (ECCV), 2018, 17 Pages.
Yao Y., et al., "MVSNet: Depth Inference for Unstructured Multiview Stereo," European Conference on Computer Vision (ECCV), 2018, pp. 767-783.
Yariv L., et al., "Multiview Neural Surface Reconstruction by Disentangling Geometry and Appearance," Neural Information Processing Systems (NeurIPS), 2020, 11 pages.
Yoon J. S., et al., "Novel View Synthesis of Dynamic Scenes With Globally Coherent Depths From a Monocular Camera," Computer Vision and Pattern Recognition (CVPR), 2020, pp. 5336-5345.
Yu A., et al., "pixelNeRF: Neural Radiance Fields from One or Few Images," arXiv, 2020, 20 pages, https://arxiv.org/abs/2012.02190.

Yuan W., et al., "STaR: Self-supervised Tracking and Reconstruction of Rigid Objects in Motion with Neural Rendering," arXiv:2101.01602, 2020, 12 pages.
Zhang K., et al., "NeRF++: Analyzing and Improving Neural Radiance Fields," arXiv preprint arXiv:2010.07492, 2020, 9 Pages.
Zhang R., et al., "The Unreasonable Effectiveness of Deep Features as a Perceptual Metric," In Proceedings of the IEEE Conference on Computer Vision and Pattern Recognition, 2018, 10 pages.
Zhou T., et al., "Stereo Magnification: Learning View Synthesis using Multiplane Images," ACM Transactions Graph, Aug. 2018, vol. 37 (4), Article 65, pp. 65:1-65:12.
Zhou T., et al., "View Synthesis by Appearance Flow," European Conference on Computer Vision (ECCV), 2016, pp. 286-301.
Zitnick C.L., et al., "High-Quality Video View Interpolation Using a Layered Representation," ACM Transactions on Graphics (Proc. SIGGRAPH), 2004, vol. 23, No. 3, pp. 600-608.
Zollhofer M., et al., "State of the Art on 3D Reconstruction with RGB-D Cameras," Computer Graphics Forum, 2018, vol. 37, No. 2, pp. 625-652.
Gafni G., et al., "Dynamic Neural Radiance Fields for Monocular 4D Facial Avatar Reconstruction," 2020, 11 pages, Retrieved from Internet: URL: https://arxiv.org/abs/2012.03065.
International Search Report and Written Opinion for International Application No. PCT/US2022/013888, mailed Aug. 30, 2022, 10 pages.
Li H., et al., "Temporally Coherent Completion of Dynamic Shapes," ACM Transactions on Graphics (TOG), 2012, vol. 31, No. 1, pp. 1-11.
Li Z., et al., "Crowdsampling the Plenoptic Function," European Conference on Computer Vision (ECCV), 2020, pp. 178-196.
Li Z., et al., "Neural Scene Flow Fields for Space-Time View Synthesis of Dynamic Scenes," arXiv:2011.13084, 2020, 11 pages.
Lindell D.B., et al., "AutoInt: Automatic Integration for Fast Neural Volume Rendering," arXiv:2012.01714, 2020, 15 pages.
Liu C., et al., "Neural RGB(r)D Sensing: Depth and Uncertainty From a Video Camera," Computer Vision and Pattern Recognition (CVPR), 2019, pp. 10986-10995.
Liu L., et al., "Neural Sparse Voxel Fields," Neural Information Processing Systems (NeurIPS), 2020, 20 pages.
Lombardi S., et al., "Neural Volumes: Learning Dynamic Renderable vols. from Images," ACM Transactions Graph, Jun. 18, 2019, vol. 38 (4), Article 65, pp. 1-14, XP081383263.
Luo X., et al., "Consistent Video Depth Estimation," ACM Transactions on Graphics (ACM), 2020, vol. 39, No. 4, pp. 71:1-71:13.
Martin-Brualla R., et al., "NeRF in the Wild: Neural Radiance Fields for Unconstrained Photo Collections," Computer Vision and Pattern Recognition (CVPR), 2020, arXiv: 2008.02268v2 [cs.CV], 14 Pages.
Marwah K., et al., "Compressive Light Field Photography using Overcomplete Dictionaries and Optimized Projections," ACM Transactions on Graphics (TOG), 2013, vol. 32, No. 4, pp. 1-12.
Meka A., et al., "Deep Reflectance Fields: High-Quality Facial Reflectance Field Inference from Color Gradient Illumination," ACM Transactions on Graphics (TOG), 2019, vol. 38, No. 4, pp. 1-12.
Mescheder L., et al., "Occupancy Networks: Learning 3D Reconstruction in Function Space," Computer Vision and Pattern Recognition (CVPR), 2019, pp. 4460-4470.
Meshry M., et al., "Neural Rerendering in the Wild," Proceedings of the IEEE Conference on Computer Vision and Pattern Recognition (CVPR), 2019, pp. 6878-6887.
Michalkiewicz M., "Implicit Surface Representations as Layers in Neural Networks," International Conference on Computer Vision (ICCV), 2019, pp. 4743-4752.
Mildenhall B., et al., "Local Light Field Fusion: Practical View Synthesis with Prescriptive Sampling Guidelines," ACM Transactions on Graphics (TOG), Jul. 12, 2019, vol. 38 (4), pp. 1-14.
Mildenhall B., et al., "NeRF: Representing Scenes as Neural Radiance Fields for View Synthesis," European Conference on Computer Vision (ECCV), Aug. 3, 2020, 25 pages.
Muller T., et al., "Neural Importance Sampling," ACM Transactions on Graphics (TOG), 2019, vol. 38, No. 5, pp. 1-19.

(56) References Cited

OTHER PUBLICATIONS

Newcombe R.A., et al., "DynamicFusion: Reconstruction and Tracking of Non-Rigid Scenes in Real-Time," In: IEEE Conference on Computer Vision and Pattern Recognition, CVPR 2015, Boston, MA, USA, Jun. 7-12, 2015, pp. 343-352.
Newcombe R.A., et al., "KinectFusion: Real-Time Dense Surface Mapping and Tracking," International Symposium on Mixed and Augmented Reality (ISMAR), 2011, 10 Pages.
Niebner M., et al., "Real-time 3D Reconstruction at Scale Using Voxel Hashing," ACM Transactions on Graphics (Proc. SIGGRAPH), 2013, vol. 32, No. 6, 11 Pages.
Niemeyer M., et al., "Differentiable Volumetric Rendering: Learning Implicit 3D Representations Without 3D Supervision," Computer Vision and Pattern Recognition (CVPR), 2020, pp. 3504-3515.
Niemeyer M., et al., "Occupancy Flow: 4D Reconstruction by Learning Particle Dynamics," International Conference on Computer Vision (ICCV), 2019, pp. 5379-5389.
Niklaus S., et al., "3D Ken Burns Effect from a Single Image," ACM Transactions on Graphics (Proc. SIGGRAPH Asia), 2019, vol. 38, No. 6, pp. 1-15.
Oechsle M., et al., "Texture Fields: Learning Texture Representations in Function Space," International Conference on Computer Vision (ICCV), 2019, pp. 4531-4540.
Orts-Escolano S., et al., "Holoportation: Virtual 3D Teleportation in Real-time," In Proceedings of the 29th Annual Symposium on User Interface Software and Technology, 2016, pp. 741-754.
Park J. J., et al., "DeepSDF: Learning Continuous Signed Distance Functions for Shape Representation," Computer Vision and Pattern Recognition (CVPR), 2019, pp. 165-174.
Park K., et al., "Deformable Neural Radiance Fields," arXiv preprint arXiv:2011.12948, 2020, 12 pages.
Penner E., et al., "Soft 3D Reconstruction for View Synthesis," ACM Transactions on Graphics, vol. 36 (6), Nov. 2017, Article 235, pp. 1-11.
Pumarola A., et al., "D-NeRF: Neural Radiance Fields for Dynamic Scenes," arXiv:2011.13961, 2020, 10 pages.
Rebain D., et al., "DeRF: Decomposed Radiance Fields," arXiv:2011.12490, 2020, 14 pages.
Riegler G., et al., "Free View Synthesis," European Conference on Computer Vision (ECCV), 2020, pp. 623-640.
Saito S., et al., "PIFu: Pixel-Aligned Implicit Function for High-Resolution Clothed Human Digitization," International Conference on Computer Vision (ICCV), 2019, pp. 2304-2314.
Saito S, et al., "PIFuHD: Multi-Level Pixel-Aligned Implicit Function for High-Resolution 3D Human Digitization," in Proceedings of the IEEE Conference on Computer Vision and Pattern Recognition (CVPR), Apr. 1, 2020, pp. 84-93.
Sara U., et al., "Image Quality Assessment through FSIM, SSIM, MSE and PSNR—A Comparative Study," Journal of Computer and Communications, 2019, vol. 7, No. 3, pp. 8-18.
Schonberger J. L., et al., "Pixelwise View Selection for Unstructured Multi-View Stereo," European Conference on Computer Vision (ECCV), Jul. 27, 2016, 18 pages.
Schonberger J. L., et al., "Structure-from-Motion Revisited," IEEE Conference on Computer Vision and Pattern Recognition (CVPR), 2016, pp. 4104-4113.
Schwarz K., et al., "GRAF: Generative Radiance Fields for 3D-Aware Image Synthesis," Advances in Neural Information Processing Systems (NeurIPS), 2020, vol. 33, 13 pages.
Shih M-L., et al., "3D Photography using Context-Aware Layered Depth Inpainting," Computer Vision and Pattern Recognition (CVPR), 2020, pp. 8028-8038.
Sitzmann V., et al., "Deep Voxels: Learning Persistent 3D Feature Embeddings," Computer Vision and Pattern Recognition, Apr. 11, 2019, 10 pages.
Srinivasan P.P., et al., "Pushing the Boundaries of View Extrapolation with Multiplane Images," Computer Vision and Pattern Recognition (CVPR), 2019, pp. 175-184.
Starck J., et al., "Surface Capture for Performance-Based Animation," IEEE Computer Graphics and Applications, 2007, vol. 27 (3), pp. 21-31.
Tancik M., et al., "Fourier Features Let Networks Learn High Frequency Functions in Low Dimensional Domains," arXiv:2006.10739, 2020, 24 pages.
Tancik M., et al., "Learned Initializations for Optimizing Coordinate-Based Neural Representations," arXiv:2012.02189, 2020, 13 pages.
Teed Z., et al., "DeepV2D: Video to Depth with Differentiable Structure from Motion," International Conference on Learning Representations (ICLR), 2020, 20 Pages.
Tewari A., et al., "State of the Art on Neural Rendering," State of the Art Report (STAR), 2020, vol. 39, No. 2, 27 Pages.
Tretschk E., et al., "Non-Rigid Neural Radiance Fields: Reconstruction and Novel View Synthesis of a Deforming Scene from Monocular Video," arXiv:2012.12247, 2020, 9 pages.
Trevithick A., et al., "GRF: Learning a General Radiance Field for 3D Scene Representation and Rendering," arXiv:2010.04595, 2020, 28 pages, https://arxiv.org/abs/2010.04595.
Tucker R., et al., "Single-View View Synthesis with Multiplane Images," Computer Vision and Pattern Recognition (CVPR), 2020, pp. 551-560.
Upchurch P., et al., "From A to Z: Supervised Transfer of Style and Content using Deep Neural Network Generators," arXiv:1603.02003, 2016, 11 pages.
Waechter M., et al., "Let there be Color! Largescale Texturing of 3D Reconstructions," European Conference on Computer Vision (ECCV), 2014, pp. 836-850.
Adelson E. H., et al., "The Plenoptic Function and the Elements of Early Vision," Computational Models of Visual Processing, MIT Press, 1991, pp. 3-20.
Andersson P., et al., "Flip: A Difference Evaluator for Alternating Images," Proceedings of the ACM on Computer Graphics and Interactive Techniques, 2020, vol. 3, No. 2, pp. 1-23.
Anonymous: "JaxNeRF," Google, 2020, 5 pages, Retrieved from the Internet: https://github.com/google-research/google-research/tree/master/jaxnerf.
Attal B., et al., "MatryODShka: Real-Time 6DoF Video View Synthesis using Multi-Sphere Images," European Conference on Computer Vision (ECCV), 2020, 19 Pages.
Atzmon M., et al., "SAL: Sign Agnostic Learning of Shapes from Raw Data," Computer Vision and Pattern Recognition (CVPR), 2020, pp. 2565-2574.
Ballan L., et al., "Unstructured Video-Based Rendering: Interactive Exploration of Casually Captured Videos," ACM Transactions on Graphics (Proc. SIGGRAPH), Jul. 2010, vol. 29 (4), Article 87, 10 pages.
Bansal A., et al., "4D Visualization of Dynamic Events from Unconstrained Multi-View Videos," IEEE/CVF Conference on Computer Vision and Pattern Recognition (CVPR), 2020, pp. 5366-5375.
Bemana M., et al., "X-Fields: Implicit Neural View-, Light- and Time-Image Interpolation," ACM Transactions on Graphics (TOG), 2020, vol. 39, No. 6, pp. 1-15.
Bi S., et al., "Deep Reflectance vols. Relightable Reconstructions from Multi-View Photometric Images," arXiv:2007.09892, 2020, 21 pages.
Boss M., et al., "NeRD: Neural Reflectance Decomposition from Image Collections," arXiv:2012.03918, 2020, 15 pages.
Broxton M., et al., "Immersive Light Field Video with a Layered Mesh Representation," ACM Transactions on Graphics, Article 86, Jul. 2020, vol. 39 (4), 15 pages.
Butler D.J., et al., "A Naturalistic Open Source Movie for Optical Flow Evaluation," European Conference on Computer Vision (ECCV), 2012, pp. 611-625.
Carranza J., et al., "Free-Viewpoint Video of Human Actors," ACM Transactions on Graphics (Proc. SIGGRAPH), 2003, vol. 22, No. 3, pp. 569-577.
Chai J-X., et al., "Plenoptic Sampling," Proceedings of the 27th annual conference on Computer graphics and Interactive techniques, 2000, pp. 307-318.
Chen S.E., et al., "View Interpolation for Image Synthesis," In ACM SIGGRAPH Conference Proceedings, 1993, pp. 279-288.

(56) References Cited

OTHER PUBLICATIONS

Choi I., et al., "Extreme View Synthesis," International Conference on Computer Vision (ICCV), 2019, pp. 7781-7790.
Collet A., et al., "High-Quality Streamable Free-Viewpoint Video," ACM Transactions on Graphics (Proc. SIGGRAPH), 2015, vol. 34, No. 4, pp. 1-13.
Curless B., et al., "A Volumetric Method for Building Complex Models from Range Images," Special Interest Group on Computer Graphics, 1996, pp. 303-312.
Dabala L., et al., "Efficient Multi-Image Correspondences for On-line Light Field Video Processing," In Computer Graphics Forum, 2016, vol. 35, No. 7, pp. 401-410.
Davis A., et al., "Unstructured Light Fields," Computer Graphics Forum, vol. 31 (2), 2012, pp. 305-314.
Debevec P., et al., "Acquiring the Reflectance Field of a Human Face," Proceedings of the 27th Annual Conference on Computer Graphics and Interactive Techniques, 2000, pp. 145-156.
Debevec P.E., et al., "Modeling and Rendering Architecture from Photographs: A Hybrid Geometry-and Image-Based Approach," Proceedings of the 23rd Annual Conference on Computer Graphics and Interactive Techniques, 1996, pp. 11-20.
Dou M., et al., "Fusion 4D: Real-time Performance Capture of Challenging Scenes," ACM Transactions on Graphics, Jul. 2016, vol. 35 (4), pp. 114:1-114:13.
Du Y., et al., "Neural Radiance Flow for 4D View Synthesis and Video Processing," arXiv:2012.09790, 2020, 14 pages.
Esteban C.H., et al., "Silhouette and Stereo Fusion for 3D Object Modeling," Computer Vision and Image Understanding, 2004, vol. 96, No. 3, pp. 367-392.
Flynn J., et al., "DeepView: View Synthesis with Learned Gradient Descent," Proceedings of the IEEE Conference on Computer Vision and Pattern Recognition (CVPR), 2019, 2367-2376.
Furukawa Y., et al., "Accurate, Dense, and Robust Multiview Stereopsis," IEEE Transactions on Pattern Analysis and Machine Intelligence, 2009, vol. 32, No. 8, pp. 1362-1376.
Furukawa Y., et al., "Multi-View Stereo: A Tutorial," Foundations and Trends® in Computer Graphics and Vision, 2015, vol. 9, No. 1-2, pp. 1-148.
Gao C., et al., "Flow-Edge Guided Video Completion," European Conference on Computer Vision (ECCV), 2020, 17 Pages.
Geman S., et al., "Bayesian Image Analysis: An Application to Single Photon Emission Tomography," American Statistical Association, 1985, pp. 12-18.
Gortler S. J., et al., "The Lumigraph," Proceedings of the 23rd Annual Conference on Computer Graphics and Interactive techniques, 1996, pp. 43-54.
Gu X., et al., "Cascade Cost Volume for High-Resolution Multi-View Stereo and Stereo Matching," Computer Vision and Pattern Recognition (CVPR), 2020, pp. 2495-2504.
Guo K., et al., "The Relightables: Volumetric Performance Capture of Humans with Realistic Relighting," ACM Transactions on Graphics, Article 217, vol. 38(6), Nov. 2019, pp. 1-19.
Habermann M., et al., "LiveCap: Real-Time Human Performance Capture from Monocular Video," ACM Transactions on Graphics (Proc. SIGGRAPH), 2019, vol. 38, No. 2, pp. 1-17.
Hedman P., et al., "Deep Blending for Free-Viewpoint Image-Based Rendering," ACM Transactions on Graphics, Nov. 2018, vol. 37 (6), Article 257, pp. 1-15.
Huang J-B., et al., "Temporally Coherent Completion of Dynamic Video," ACM Transactions on Graphics (Proc. SIGGRAPH Asia), 2016, vol. 35, No. 6, pp. 1-11.
Huang P-H., et al., "DeepMVS: Learning Multi-View Stereopsis," Computer Vision and Pattern Recognition (CVPR), 2018, pp. 2821-2830.
Huang Z., et al., "Deep Volumetric Video from Very Sparse Multi-View Performance Capture," Proceedings of the European Conference on Computer Vision (ECCV), 2018, pp. 336-354.
Ilan S., et al., "A Survey on Data-Driven Video Completion," Computer Graphics Forum, 2015, vol. 34, No. 6, pp. 60-85.
Innmann M., et al., "VolumeDeform: Real-Time Volumetric Non-Rigid Reconstruction," European Conference on Computer Vision (ECCV), Jul. 30, 2016, 17 pages.
Izadi S., et al., "KinectFusion: Real-Time 3D Reconstruction and Interaction Using a Moving Depth Camera," In Proceedings of the 24th Annual ACM Symposium on User Interface Software and Technology, 2011, pp. 559-568.
Kalantari N.K., et al., "Learning-Based View Synthesis for Light Field Cameras," ACM Transactions on Graphics (Proc. SIGGRAPH), Nov. 2016, vol. 35 (6), Article 193, 193:1-193:10, 10 pages.
Kanade T., et al., "Virtualized Reality: Constructing Virtual Worlds from Real Scenes," IEEE Multimedia, 1997, vol. 4, No. 1, pp. 34-47.
Kaplanyan A. S., et al., "DeepFovea: Neural Reconstruction for Foveated Rendering and Video Compression Using Learned Statistics of Natural Videos," ACM Transactions on Graphics (TOG), Nov. 8, 2019, vol. 38 (6), pp. 1-13.
Kar A., et al., "Learning a Multi-View Stereo Machine," Advances in Neural Information Processing Systems (NeurIPS), 2017, pp. 365-376.
Kingma D.P., et al., "Adam: A Method for Stochastic Optimization," International Conference on Learning Representations (ICLR 2015), arXiv:1412.6980v9 [cs.LG], Jan. 30, 2017, 15 pages.
Kopf J., et al., "One Shot 3D Photography," ACM Transactions on Graphics (Proc. SIGGRAPH), 2020, vol. 39, No. 4, pp. 76:1-76:13.
Lassner C., et al., "Pulsar: Efficient Sphere-Based Neural Rendering," arXiv:2004.07484, 2020, 13 pages.
Laurentini A., "The Visual Hull Concept for Silhouette-Based Image Understanding," IEEE Transactions on Pattern Analysis and Machine Intelligence, 1994, vol. 16, No. 2, pp. 150-162.
Levoy M., et al., "Light Field Rendering," Proceedings of the 23rd Annual Conference on Computer Graphics and Interactive Techniques, 1996, pp. 31-42.

\* cited by examiner

NEURAL 3D VIDEO SYNTHESIS

PRIORITY

This application claims the benefit under 35 U.S.C. § 119(e) of U.S. Provisional Patent Application No. 63/142,234, filed 27 Jan. 2021, which is incorporated herein by reference.

TECHNICAL FIELD

This disclosure generally relates to computer graphics, and more specifically, to 3D video synthesis.

BACKGROUND

Photorealistic representation and rendering of dynamic real-world scenes are highly challenging research topics, with many important applications that range from movie production to virtual and augmented reality. Dynamic real-world scenes are notoriously hard to model using classical mesh-based representations since they often contain thin structures, semi-transparent objects, specular surfaces, and topology that constantly evolves over time due to the often complex scene motion of multiple objects and people.

Recent neural volume rendering approaches show a promising direction to reconstruct and render complex scenes with intricate geometry and view-dependency from multi-view input. Neural radiance field (NeRF) represents a static scene based on a Multi-Layer Perceptron (MLP) that maps a continuous 5D coordinate (camera position x and viewing direction d) to local color and opacity estimates. This representation allows for high-fidelity reproduction of extremely complex real-world scenes that would pose significant challenges to commonly used representations and algorithms, while its continuous nature and compact memory footprint do not limit the resolution of the representations or final rendering. However, the ray marching, required both to train and to render a neural radiance field, involves hundreds of MLP evaluations for each ray. While this might be acceptable for a static snapshot of a scene, directly reconstructing a dynamic scene as a sequence of per-frame neural radiance fields would be prohibitive as both storage and training time increase linearly with time. For example, to represent a 10 second-long, 30 fps multi-view video recording by 18 cameras, a per-frame NeRF would require about 15,000 GPU hours in training and about 1 GB in storage. More importantly, such obtained representations would only reproduce the world as a discrete set of snapshots (each frame is a snapshot), lacking any means to reproduce the world in-between. On the other hand, Neural Volumes is able to handle dynamic objects and even renders at interactive frame rates. Its limitation is the underlying dense uniform voxel grid that limits the resolution and/or size of the reconstructed dynamic scene due to the inherent $O(n^3)$ memory complexity. This approach is restricted to modeling single objects in isolation and cannot be easily extended to an entire dynamic scene.

SUMMARY OF PARTICULAR EMBODIMENTS

Embodiments described herein relate to a novel approach for 3D video synthesis that is able to represent multi-view video recordings of a dynamic real-world scene in a compact yet expressive representation that enables high-quality view synthesis and motion interpolation. Our approach takes the high quality and compactness of static neural radiance fields in a new direction: to a model-free, dynamic setting. At the core of our approach is a novel time-conditioned neural radiance field that represents scene dynamics using a set of compact latent codes. To exploit the fact that changes between adjacent frames of a video are typically small and locally consistent, certain embodiments use two strategies for efficient training of our neural network: 1) an efficient hierarchical training scheme, and 2) an importance sampling strategy that selects the next rays for training based on the temporal variation of the input videos. In combination, these two strategies significantly boost the training speed, lead to fast convergence of the training process, and enable high-quality results. The learned representation is highly compact and able to represent a 10 second 30 FPS multi-view video recording by 18 cameras with a model size of just 28 MB. The embodiments described herein can render high-fidelity wide-angle novel views at over 1K resolution, even for highly complex and dynamic scenes.

First, particular embodiments extend neural radiance fields to the space-time domain. Instead of directly using time as an input, particular embodiments parameterize scene motion and appearance changes by a set of compact latent codes that are simultaneously optimized during training. This results in a compact, continuous space-time representation that shares time-invariant information across the entire video. The latent learned codes show more expressive power compared to a timestamp, allowing for recording the vivid details of moving geometry and texture. They also allow for smooth interpolation in time, which enables visual effects such as slow-motion or 'bullet time.'

Second, particular embodiments use importance sampling strategies for dynamic radiance fields. Ray-based training of neural scene representations treats each pixel as an independent training sample and requires thousands of iterations to go through all pixels observed from all views. However, captured dynamic video often exhibits a small amount of pixel change between frames. This opens up an opportunity to significantly boost the training progress by selecting the pixels that are most important for training. Specifically, in the time dimension, we schedule training with coarse-to-fine hierarchical sampling in the frames. We first train our model until convergence using a subset of selected keyframes. Afterward, we employ the keyframe model to initialize the training on the full video sequence. In the ray/pixel dimension, our design tends to sample those pixels that are more time-variant than others. In particular, we propose a global and a motion derivative importance sampling strategy. These strategies allow us to shorten the training time of long sequences significantly, while retaining high-quality reconstruction results.

Experiments conducted using a multi-view rig of 18 cameras show promising results in multiple different challenging dynamic environments with highly complex view-dependent and time-dependent effects. The results achieve photorealistic continuous novel-view rendering in space and time, which enables various cinematic effects like bullet-time and slow-motion. Compared to the naïve per-frame NeRF baseline, we show that with our combined temporal and spatial importance sampling, we achieve at least two orders of magnitude acceleration in training speed, with a model that is 40 times smaller in size for 10 seconds of a 30 FPS 3D video.

In sum, embodiments described herein propose a novel dynamic neural radiance field that achieves high-quality 3D video synthesis of complex, dynamic real-world scenes. Our approach of jointly learning temporal latent codes allows for high-quality view synthesis and motion interpolation. Our representation is a compact version of the 6D plenoptic function within the chosen subvolume. In addition, embodiments described herein present novel training strategies based on hierarchical training and importance sampling in the spatiotemporal domain, which boost training speed significantly and lead to higher quality results for longer sequences.

In particular embodiments, a computing system may initialize latent codes respectively associated with times associated with frames in a training video of a scene captured by a camera. For each of the frames, the computing system may generate rendered pixel values for a set of pixels in the frame by querying a neural radiance field (NeRF) using the latent code associated with the frame, a camera viewpoint associated with the frame, and ray directions associated with the set of pixels. The computing system may update the latent code associated with the frame and the NeRF based on comparisons between the rendered pixel values and original pixel values for the set of pixels. After training, the computing system may render output frames for an output video of the scene, wherein each output frame is rendered by querying the updated NeRF using one of the updated latent codes corresponding to a desired time associated with the output frame, a desired viewpoint for the output frame, and ray directions associated with pixels in the output frame.

In particular embodiments, the computing system may further update the latent codes and the NeRF using a second training video of the scene captured by a second camera having a second camera viewpoint different from a first camera viewpoint of the camera, wherein the second training videos and the training video are captured concurrently. In particular embodiments, a first frame of the frames in the training video and a second frame in the second training video are both associated with a particular time and used for updating the latent code associated with the particular time.

In particular embodiments, the desired viewpoint for the output frame is different from any camera viewpoint associated with any frame used in updating the NeRF.

In particular embodiments, each of the latent codes consists of a predetermined number of values.

In particular embodiments, the computing system may further render, for the output video, an additional output frame associated with an additional desired time that is temporally between two adjacent frames of the frames in the training video, wherein the additional output frame is rendered by querying the updated NeRF using an interpolated latent code generated by interpolating the updated latent codes associated with the two adjacent frames.

In particular embodiments, the computing system may further determine temporal variances of a plurality of pixels in the frames of the training video. The computing system may select, based on the temporal variances, the set of pixels from the plurality of pixels for updating the NeRF and the latent codes. In particular embodiments, the temporal variances are used to determine probabilities of the corresponding pixels in the plurality of pixels being selected into the set of pixels used for updating the NeRF and the latent codes.

In particular embodiments, the frames of the training video used for updating the NeRF and the latent codes are keyframes within a larger set of frames of the training video. The computing system may further select the keyframes from the larger set of frames based on the positions of the keyframes in the larger set of frames. In particular embodiments, the positions of the keyframes in the larger set of frames are equally spaced by a predetermined number of frames. In particular embodiments, after updating the NeRF and latent codes using the keyframes, the computing system may update the NeRF and the latent codes using additional frames in the larger set of frames in between the keyframes.

The embodiments disclosed herein are only examples, and the scope of this disclosure is not limited to them. Particular embodiments may include all, some, or none of the components, elements, features, functions, operations, or steps of the embodiments disclosed herein. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DESCRIPTION OF EXAMPLE EMBODIMENTS

Figure 1:
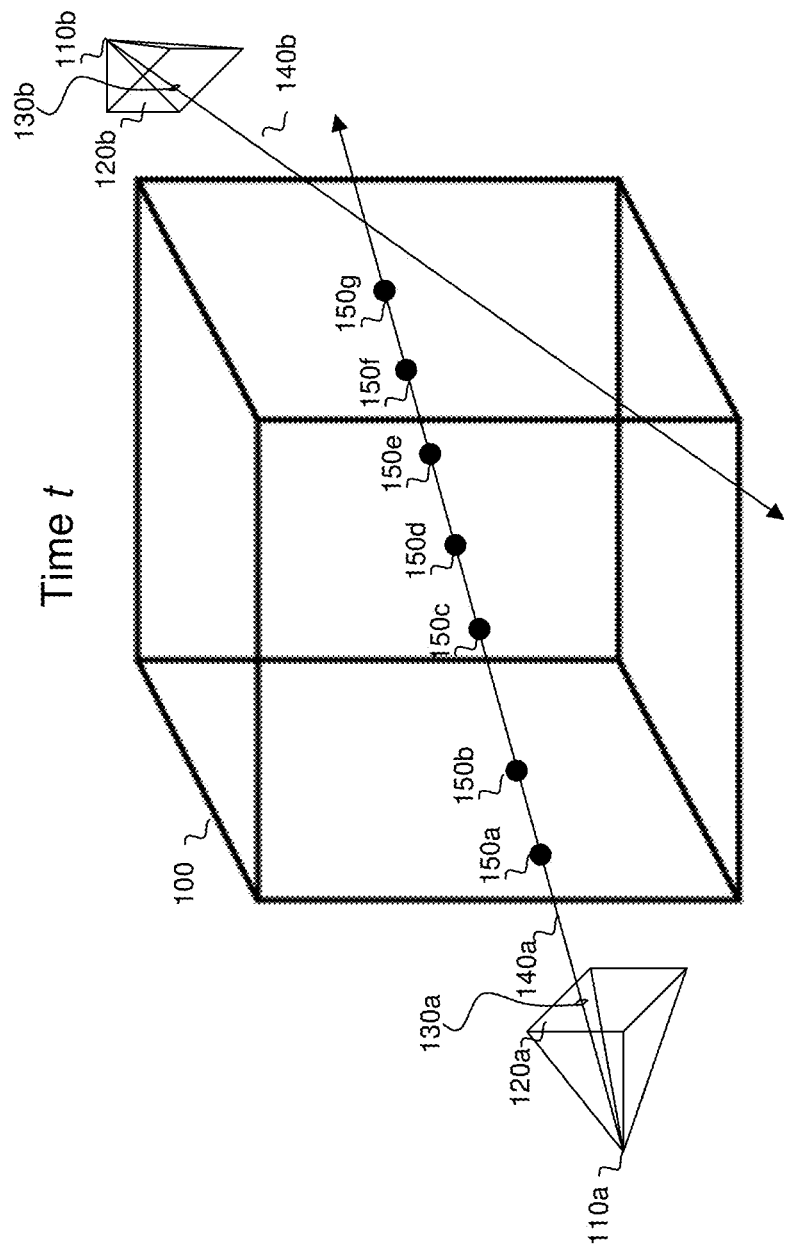
FIG. 1 illustrates a conceptual representation of certain features of a continuous space-time Neural Radiance Fields (NeRF).

Particular embodiments described herein relate to systems and methods of generating a spatial-temporal representation of a dynamic scene with moving objects based on videos that capture scene information in both spatial and temporal domains. The spatial-temporal representation may be a Neural Radiance Field (NeRF). Once trained, NeRF may be used to create new views of the dynamic scene from arbitrary viewpoints and arbitrary times. The space-time NeRF may include a multi-layer perceptron (MLP) which can be trained using training samples during the training stage and queried at the inference stage to generate images for desired viewpoints and times to represent the dynamic scene. NeRF may use a continuous volume rendering method that allows the color of a pixel to be determined by integrating the radiance as modulated by the volume density along the camera ray.

More formally, embodiments described herein may be used to tackle the problem of reconstructing dynamic 3D scenes from video inputs from multiple cameras, i.e., $\{C^{(t)}\}$ for time index $t \in T=\{1, 2, \ldots, T\}$ with known camera intrinsic and extrinsic parameters. The resulting representation should be able to render photorealistic images from a wide range of camera views and at arbitrary times in the recordings. For example, a dynamic scene may include any number of objects in motion, such as a person performing some task, like cooking. The dynamic scene may be simultaneously recorded by several cameras (e.g., 5, 10, or 20 cameras) over a period of time. The cameras each has a location in 3D space and a corresponding view direction. The viewpoint of each of the recorded videos may be static. Despite the static camera positions, embodiments described herein learn a representation of the dynamic scene using the videos recorded and enable a novel view of the dynamic scene to be reconstructed for any time instant. In other words, the reconstructed video may show the dynamic scene from a perspective different from any of the cameras used to record the original videos.

We achieve this goal with a continuous space-time Neural Radiance Fields (NeRF), controllable by a series of learned temporal latent embeddings/codes. The learned spatial-temporal representation of NeRF is able to compress the vast discrete amount of input videos from multiple cameras to a compact 6D representation that can be continuously queried. The learned temporal embedding/codes capture detailed temporal effects, such as topological changes, radiance changes, such as self-casted shadows, volumetric effects, such as a flame. This is a simple yet effective design that is able to represent one order of magnitude longer 3D video than the current state-of-the-art methods. Once the continuous space-time NeRF learns the 3D dynamic scene, it could be used to reconstruct a new video of the dynamic scene from any novel viewpoint. For example, each frame of the new video may be generated by querying NeRF using any desired viewpoint (including view position and direction in 3D space), field of view, and/or time. The desired viewpoint has a 3D position (akin to a virtual camera). The image plane of the virtual camera has a plurality of pixels. The pixel value (e.g., color and/or opacity) of each pixel may be queried from NeRF using a ray cast from the viewpoint through that pixel in the image plane. The ray may be defined by the viewpoint and a ray direction. The ray, along with a time representation specifying the desired time, may be used to query NeRF for several samples along the ray for color and opacity data. The samples along the ray may be aggregated to provide a final pixel value (color and opacity) for the pixel of interest. This process may be repeated for every pixel within the desired frame to reconstruct the whole frame. Different pixels of each frame are generated using the same viewpoint and time representation but different ray directions. Different frames within the new video would be queried from NeRF using different time representations.

FIG. 1 illustrates a conceptual representation of certain features of a continuous space-time Neural Radiance Fields (NeRF) according to particular embodiments. During training, the volume 100 may include a dynamic scene with moving objects (e.g., a person cooking, pets running around, etc.). The dynamic scene may be simultaneously captured in training videos by multiple cameras over time. For example, one camera may have a camera viewpoint 110a, and another camera may have a camera viewpoint 110b. For simplicity, FIG. 1 illustrates two camera viewpoints 110a, 110b, but any other number of camera viewpoints may be used instead (e.g., 10, 18, 20, etc.). The camera viewpoints 110a-b have their respective image planes 120a-b. Each of the image planes 120a-b has multiple pixels. For simplicity, FIG. 1 shows an example of a pixel 130a in image plane 120a and another example of a pixel 130b in image plane 120b. For each pixel, a ray may be drawn from the camera viewpoint through that pixel. FIG. 1 shows a ray 140a being drawn from the camera viewpoint 110a through the pixel 130a. Similarly, a ray 140b is drawn from the camera viewpoint 110b through the pixel 130b. Each ray (e.g., 140a) associated with each pixel may be defined by the camera viewpoint (e.g., 110a) and a ray direction stemming from that viewpoint.

During training, the pixel value (e.g., color and/or opacity) of a pixel (e.g., 130a) may be generated using NeRF and volume rendering and compared to a ground truth pixel value of that pixel captured in a frame of a training video. In a training iteration, the computing system used for training may determine that a frame in a training video was captured by a camera from a camera viewpoint 110a at time t. Based on the camera's viewpoint 110a and intrinsic and extrinsic camera parameters, the computing system may determine the 3D locations of the corresponding image plane 120a and the pixels within it. A pixel (e.g., 130a) within the image plane 120a may be associated with a ray 140a defined by (1) the viewpoint 110a (the ray's origin) and (2) a ray direction pointing at the pixel. Since the frame used for training is associated with time t, the pixel is additionally associated with a latent code to represent the context at time t, as will be described in more detail below. The viewpoint, ray direction, and latent code are used to query NeRF for the color and opacity values at various sampling points 150a-g along the ray 140a. The color and opacity values of the sampling points 150a-g may be aggregated using volume rendering to generate a final pixel value for the pixel 130a. The final pixel value may then be compared to the corresponding pixel value in the ground truth frame t. The result of the comparison is then used to update NeRF and the latent code. This process may be repeated pixel-by-pixel for any number of temporal video frames of the dynamic scene captured from any number of camera viewpoints.

Once NeRF is trained, it may be used to reconstruct any frame of the dynamic scene at any desired time and from any desired viewpoint. A frame is reconstructed pixel-by-pixel. As an example, let's assume the desired frame is viewed from the perspective of the desired viewpoint 110a and at time t. For a particular pixel 130a within the image plane 120a associated with the desired viewpoint 110a, the rendering system may associate the pixel 130a with a ray 140a defined by the desired viewpoint 110a and a ray direction pointing toward the pixel 130a. The desired viewpoint 110a, ray direction, and latent code for time t may be used to query the trained NeRF for the color and/or opacity values at a series of sample points 150a-g along the ray 140a. The color and/or opacity values of the sample points 150*a-g* may be aggregated, such as using volume rendering techniques, to generate a rendered pixel value for the pixel 130*a*. This process may be repeated for each pixel within the desired frame. As will be described in further detail below, the desired time and/or desired viewpoint may be different from the times and camera viewpoints associated with ground truth frames used during training.

More formally, the problem of representing 3D video boils down to learning the 6D plenoptic function that maps a viewpoint $x \in \mathbb{R}^3$, ray direction $d \in \mathbb{R}^2$ from the viewpoint, and time variable $t \in \mathbb{R}$, to RGB radiance $c \in \mathbb{R}^3$ and opacity/alpha $a \in \mathbb{R}$.

Conventional NeRF approximates the 5D plenoptic function of a static scene with a learnable function:

$$F_\Theta : (x, d) \to (c, \sigma) \quad (1)$$

The function is given by a Multi-Layer Perceptron (MLP) with trainable weights $\Theta$. NeRF can learn a static scene based on multi-view images of that scene (e.g., 15 photos of the same static scene captured from different viewpoints). Once learned, NeRF may be queried to generate an image of the scene from a novel viewpoint (i.e., the viewpoint may be different from any of the viewpoints of the 15 photos used for training NeRF). The desired image of the scene has a desired viewpoint x and a corresponding image plane. The image plane has a plurality of pixels (e.g., 1000×1000 pixels). To determined the color value of each pixel, a ray may be cast from the viewpoint toward that pixel in the image plane, which is the ray direction d. The viewpoint x and ray direction d define a ray used for querying NeRF for the pixel value of the pixel of interest. Color c and opacity σ values sampled along the ray may be queried from NeRF and aggregated to form the final pixel value for the pixel. This design has been shown to synthesize high fidelity novel views for static scenes only, and it is not trivial to extend it to dynamic 3D scenes.

In particular embodiments, one potential solution is to add a time dependency t to the function:

$$F_\Theta : (x, d, t) \to (c, \sigma) \quad (2)$$

The 1-dimensional time variable t can be mapped via positional encoding to a higher-dimensional space, in a manner similar to how NeRF handles the inputs x and d. However, empirical experiments have found that it is challenging for this design to capture complex dynamic 3D scenes with challenging topological changes and time-dependent volumetric effects, such as flames (e.g., in a dynamic scene that involves cooking).

Instead of a 1-dimensional time variable t, particular embodiments model the dynamic scene by latent codes $z_t \in \mathbb{R}^D$. A set of time-dependent latent codes, indexed by discrete time variable t, is learned with the function:

$$F_\Theta : (x, d, z_t) \to (c, \sigma) \quad (3)$$

The time-dependent latent codes $\{z_t\}$ provide a compact representation of the state of a dynamic scene at a certain time, which can cope well with variants of complex scene dynamics and radiance changes implicitly. We apply positional encoding to the input position coordinates (e.g., x and d) to map them to a higher-dimensional based on a series of sinusoidal functions. In particular embodiments, no positional encoding is applied to the time-dependent latent codes.

In particular embodiments, before training, the latent codes $\{z_t\}$ are randomly initialized in an independent manner across the frames. For example, before training, the latent code $z_1$ corresponding to the frame at time t=1 may be randomly initialized to some vector of values with D dimensions. Similarly, the latent code $z_2$ corresponding to the frame at time t=2 may be randomly initialized to another vector of values, and so on. During training, the latent codes will be iteratively updated based on the loss computed after each training iteration. After NeRF is trained, the latent code $z_t$ may be used to specify a particular desired state of the dynamic scene at a certain time t and used to query NeRF for the radiance observed from a particular desired viewpoint and view direction.

Figure 2:
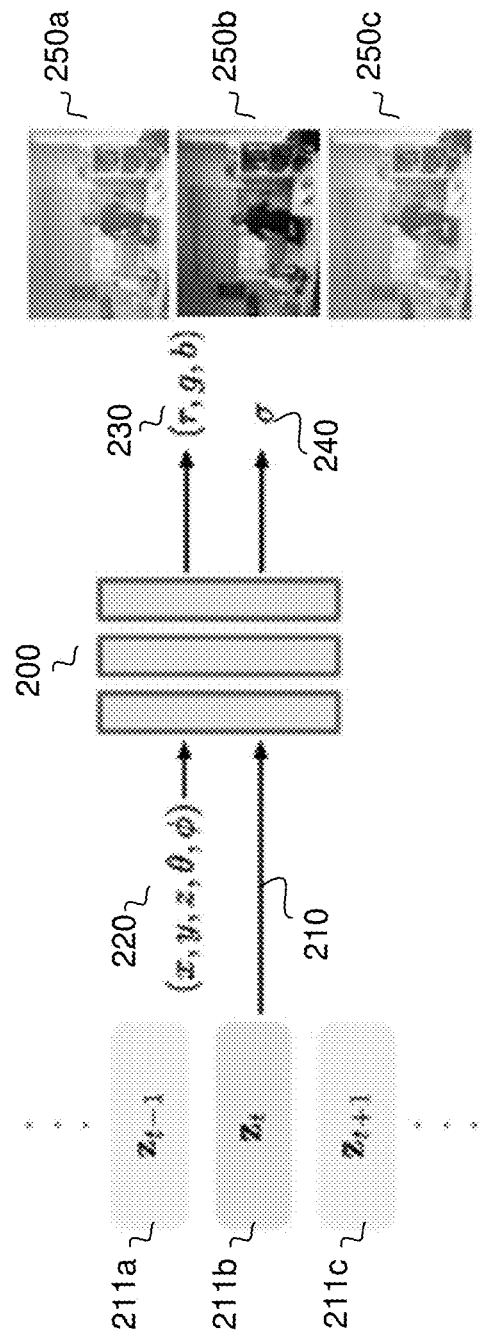
FIG. 2 illustrates a rendering process using a spatial-temporal NeRF according to particular embodiments.

FIG. 2 illustrates an embodiment for using NeRF to synthesize the value of a pixel. NeRF 200 is a machine learning model conditioned on a compact yet expressive time-variant latent code 210 and a view ray 220, which may be specified as a viewpoint (x, y, z) and view direction (θ, Φ). The latent code 210 represents the state of a dynamic scene at a particular time. The latent code 210 that is input to NeRF 200 may be selected from any number of latent codes (e.g., $z_{t-1}$, 211*a*, $z_t$ 211*b*, or $z_{t+1}$ 211*c*) corresponding to different instances in time (e.g., time t−1, t, or t+1, respectively). By processing a given latent code 210 and a desired view ray 220 for a pixel, NeRF 200 outputs a color 230 and opacity 240 of the pixel corresponding to the view ray 220 for the moment in time that corresponds to the latent code 210. The final pixel value (color 230 and opacity 240) may be the result of aggregating (e.g., using volume rendering) sampled values at multiple sample points along the ray 220. NeRF may be used in this manner to generate the values for every pixel in a frame to complete the frame. For example, one may desire to generate a frame depicting the dynamic scene at time t from a desired view position p (represented as a 3D coordinate). For each pixel in the frame, a view ray 220 may be determined based on the desired view position p and the position of that pixel in 3D space (i.e., the view ray 220 extends from the view position p and through the pixel in 3D space). The view ray 220 of each pixel in the frame and the latent code $z_t$ corresponding to time t may be processed by NeRF to generate the color 230 and opacity 240 values for the pixel. The output frame 250*b* is an example of the dynamic cooking scene at time t as viewed from the perspective of the view position p. In a similar manner, NeRF may be used to generate the frame 250*a* for time t−1 using the latent code $z_{t-1}$ 211*a* and frame 150*c* for time t+1 using the latent code $z_{t+1}$1 211*c*.

Although FIG. 1 shows NeRF being used to render frames that correspond to discrete integer frames (e.g., frames at time t−1, t, and t+1), NeRF can also be used to render subframes (i.e., frames between the integer frames). In other words, NeRF allows for continuous time interpolation. During training, the dynamic neural radiance field may be trained on video datasets that capture appearance only at discrete integer frame numbers. To render at arbitrary and continuous time indices, we can linearly interpolate the neighboring latent codes that have been found for the integer frame indices. For example, if one desires to render a subframe at time t+0.5, which is halfway between time t and time t+1, the corresponding learned latent codes $z_t$ and $z_{t+1}$ may be linearly interpolated to generate an interpolated latent code $z_{t+0.5}$ for time t+0.5. The interpolated latent code $z_{t+0.5}$, along with a desired view position and view direction, may be provided to NeRF as input to generate the desired pixel value. Rendering with interpolated latent codes results in a smooth and reasonable dynamic behavior between the two close temporal training frames. This can enable rendering of special visual effects such as slow-motion by interpolating sub-frame latent codes between two discrete time-dependent latent codes and the 'bullet time' effect with view-dependent effect by querying any latent code at any continuous-time within the video.

In particular embodiments, NeRF may use volume rendering techniques to produce photorealistic images from arbitrary camera views and time from the dynamic neural radiance field. The rendering process is used both at run time after NeRF has been trained and during training. Conceptually, NeRF learns and encodes the radiance and opacity values of a dynamic scene over time based on video frames captured by multiple cameras. The learned representation of NeRF may be thought of as a volume representation of the spatial-temporal features of the dynamic scene. When provided with a desired latent code $z_t$, a viewpoint, and a view direction, NeRF would return the radiance and opacity values of various sample points along a corresponding ray that traverse the volume representation. The radiance and opacity values sampled along the ray may be blended/fused to generate the final output color and opacity value of the pixel.

More formally, given a ray r(s)=o+sd (origin o and direction d defined by the specified camera pose and camera intrinsics), the rendered color of the pixel corresponding to this ray C(r) is an integral over the radiance weighted by accumulated opacity:

$$C^{(t)}(r) = \int_{s_n}^{s_f} T(s) \sigma(r(s), z_t) c(r(s), d, z_t)) ds. \quad (4)$$

Here, $T(s) = \exp(-\int_{s_n}^{s} \sigma(r(p), z_t)) dp)$ and $s_n$, and $s_f$ define the bounds of the volume depth range. The quadrature can be approximated by evaluating radiance and opacity at discrete sampled points along the rays. In particular embodiments, a hierarchical sampling strategy is used with first stratified sampling on the coarse level followed by importance sampling on the fine level.

In particular embodiments, dynamic neural radiance field is trained on video datasets that capture appearance at discrete integer frame numbers (e.g., a video in the training dataset may have 30 evenly spaced frames in a second, with each frame having a corresponding integer index). To render at arbitrary and continuous time indices, particular embodiments can interpolate (e.g., linearly or any other suitable interpolation scheme) the neighboring latent codes that have been found for the integer frame indices. For example, to render a subframe at time index 2.6 between integer frames 2 and 3, the latent codes for frames 2 and 3 may be linearly interpolated to generate an interpolated latent code for the subframe. The interpolated latent code for the subframe may be used along with a desired viewpoint and view direction to have NeRF render a subframe corresponding to the time index at 2.6. Experiments have shown that rendering with interpolated latent codes results in a smooth and reasonable dynamic behavior between the two close temporal training frames. This can enable rendering of special visual effects such as slow motion by interpolating sub-frame latent codes between two discrete time-dependent latent codes and the 'bullet time' effect with view-dependent effect by querying any latent code at any continuous time within the video.

The learnable function weights $\Theta$ and the latent codes $\{z_t\}$ are simultaneously trained by minimizing the $\ell_2$-loss between the rendered images C(r) and the ground truth images Ĉ(r), and summed over all rays r that correspond to the image pixels from all training camera views R and throughout all time indices t of the recording:

$$L = \Sigma_{t \in T} \Sigma_{r \in R} [\|\hat{C}_c^{(t)}(r) - C^{(t)}(r)\|_2^2 + \|\hat{C}_f^{(t)}(r) - C^{(t)}(r)\|_2^2] \quad (5)$$

Figure 3:
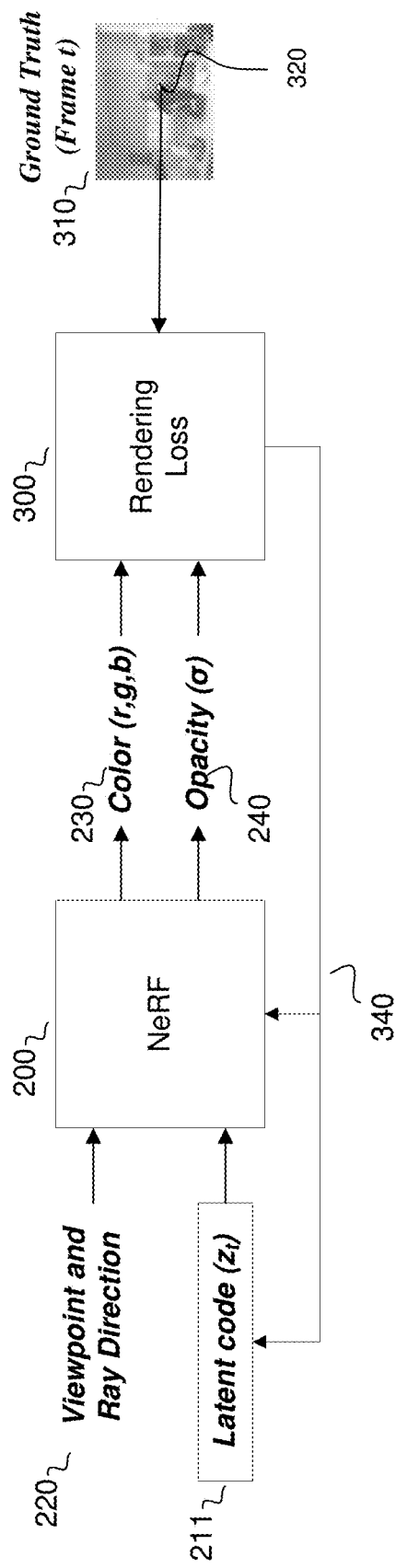
FIG. 3 illustrates a training process for temporal latent codes and a spatial-temporal NeRF according to particular embodiments.

FIG. 3 illustrates a training process for temporal latent codes and a spatial-temporal NeRF, according to particular embodiments. For example, for a given pixel 320 in a frame 310 used for training, the training system determines a corresponding ray 220 (defined by a viewpoint and ray direction) for the pixel location, as previously described. If the frame 310 used for training is associated with time t, the training system would retrieve the corresponding latent code $z_t$ 211. At the start of training, the latent code 211 may be a randomly generated vector of values (e.g., the vector may have a predetermined number of values, such as 1024 or any other suitable number). In subsequent training iterations, the latent code 211 used would be an updated latent code that has been updated based on previous training iterations. The latent code 211 and ray 220 are used to query NeRF 200 for the pixel value of the pixel of interest, which may include a color 230 component and/or an opacity 240 component. The generated pixel value (color 230 and/or opacity 240) may be compared to the pixel value of the corresponding pixel 320 in the ground-truth frame 310 using a loss function 300. For example, the loss function may be Equation (5) above, which aggregates the loss of multiple rays across multiple frames and camera views. The resulting loss value is backpropagated 340 to update NeRF 200 and the latent codes 211 used during training. This training process may continue until NeRF 200 and latent codes 211 converge (e.g., the rendering loss is below a certain threshold) and/or the training data set is exhausted.

One challenge of the ray-tracing-based neural rendering is the significant amount of training time. For example, training NeRF requires about 50 GPU hours for a single frame captured from about twenty 1K resolution images. It becomes infeasible to scale up this computation to train 3D video frames and achieve similar photorealistic quality.

The appearance changes in the natural video between adjacent frames are typically small and locally consistent. To explore how temporal redundancy can be exploited in the context of 3D video, we propose two strategies to accelerate the training process: 1) importance sampling that prefers rays around regions of higher temporal variance and 2) hierarchical training that optimizes data over a coarse-to-fine frame selection. These two strategies combined can be regarded as an adaptive sampling approach for reconstructing the 6D plenoptic function, contributing to significantly faster training and improved rendering quality. The two strategies, either alone or in combination, may be used with the training process described above (e.g., with reference to FIGS. 1-3) to improve training speed and rendering quality.

Ray Importance Sampling

Existing ray-based neural rendering methods, including NeRF network, are trained on randomly sampled rays. The number of iterations it takes in training per epoch scales linearly with the number of the pixels in the multi-view videos. For a 10 second 30 FPS video sequence observed from 18 camera views, it takes 18 billion ray sampling per epoch. To train one epoch using 8 GPU, it takes about 600K iterations or about one week. This sampling process is one of the biggest challenges for ray-based neural rendering methods to train 3D video at scale.

However, for a natural video, a large proportion of the dynamic scene is either time-invariant or only contains a small radiance change at a particular timestamp across the entire observed videos. This fact leads to a significant imbalance in the pixel observation and their contribution to the final representation. On the one hand, the perceptual quality in the time-invariant region saturates after a certain number of pixels. On the other hand, reconstructing the time-variant regions with high photorealism requires sampling every single moving pixel observed every single timestamp, which has a significantly lower ratio in every epoch to be sampled and more epochs in training. Therefore, training all pixels with an equal amount of attention using uniform pixel sampling would be a waste of computational resources to achieve photorealistic 3D video.

Figure 4:
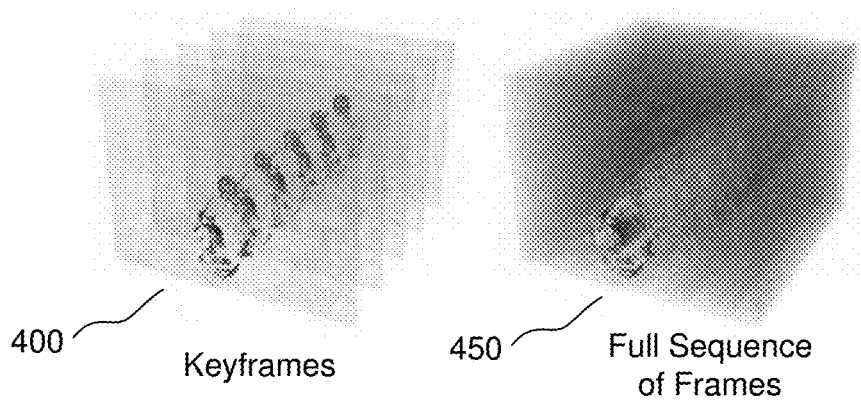
FIG. 4 illustrates sampling probability with heatmap visualizations (hot and opaque means high probability) used in hierarchical training (from keyframes to full sequence) and ray importance sampling technique to focus on high-variant rays according to particular embodiments.

To address this issue, particular embodiments sample the rays across time with different importance based on the temporal variation of the input videos. An example is shown in FIG. 4, which illustrates sampling probability with heatmap visualizations, according to particular embodiments. FIG. 4 visualizes the heatmaps of a series of keyframes 400 in a video and the full sequence of frames 450 in the video. The heatmap of each frame shows the temporal variance of each pixel within the frame. Pixels with high temporal variance are opaque and shown in a warm color, such as red, while pixels with relatively lower temporal variance are shown in a cold color, such as blue. A pixel's temporal variance is directly proportional to the probability of that pixel being selected for training NeRF 200 and latent codes 211. For example, "hot" pixels may be 90% likely selected for training, whereas "cold" pixels may be 15% likely selected.

In particular embodiments, for each observed ray r at time t, a weight W(t)(r) is computed to represent the ray/pixel's temporal variance. In each iteration during training, particular embodiments randomly sample all the views at time t. The weight of the rays from all the input views is first normalized. Then, we apply inverse transform sampling to sample those pixels using the normalized weights of all the rays at time t.

To calculate the weight of each ray, we propose two strategies based on two different insights. In the first one, we calculate the weight map of each ray based on the residual difference of that ray compared to the global median pixel value of that ray across time. We call this strategy importance sampling based on the global median map (NeRF-ISG). In the other one, we consider two temporal frames close in time and calculate the weight based on the residuals of the two frames. This approximates the motion derivative between the temporal frames, which we call importance sampling based on motion derivative (NeRF-ISMD). We explain the details of the two strategies below.

Importance Sampling based on the Global Median Map (NeRF-ISG)). For each ground truth video, we first calculate the global median value of each pixel across time $$\overline{C}(r) = \underset{t \in T}{\mathrm{median}}\, C^{(t)}(r).$$

and cache the global median image. During training, we compare each frame to the global median image and compute the residual. We choose a robust $\ell_1$-norm of the residuals to balance the contrast of weight. The norm measures the transformed values by a non-linear transfer function $\psi(\cdot)$ that is parameterized by $\theta$ to adjust the sensitivity at various ranges of variance:

$$W^{(t)}(r) = \tfrac{1}{3}\|\psi(C^{(t)}(r) - \overline{C}(r); \theta)\|_1 \qquad (6)$$

Here, $$\psi(x; \theta) = \frac{x^2}{x^2 + \theta^2}$$

is the German-McLure robust function applied element-wise. Intuitively, a larger $\theta$ will lead to a high probability to sample the time-variant region, and $\theta$ approaching zero will approximate uniform sampling. The $\ell_1$-norm is applied along the RGB channel dimension $\overline{C}(r)$ is a representative images across time, which can also take other form such as mean. We empirically validated that using median is more effective to handle high-frequency signal of moving regions across time, which helps to us approach sharp results faster during training.

Importance Sampling based on Motion derivative (NeRF-ISM). An alternative strategy, NeRF-ISM, calculates the residuals by considering two nearby frames in time $t_i$ and $t_j$. In this strategy, we focus on sampling on the pixels with the largest temporal difference. If they are within a 25-frame distance in a batch, $|t_i-t_j|\leq 25$, we calculate the residuals between the temporal frames, averaged over the 3 color channels $$W^{(t)}(r) = \min(\tfrac{1}{3}\|C^{(t_i)} - C^{(t_j)}\|_1, \alpha) \qquad (7)$$

To ensure that we do not sample pixels whose values changed due to spurious artifacts, we clamp $W^{(t)}(r)$ with a lower-bound $\alpha$, which is a hyper-parameter.

Hierarchical Training

Keyframes are one of the important foundations of video compression techniques. We adapt this idea to our 3D video scenario by firstly training for a set of keyframes and then training for all in-between frames together with the keyframes.

Figure 5A:
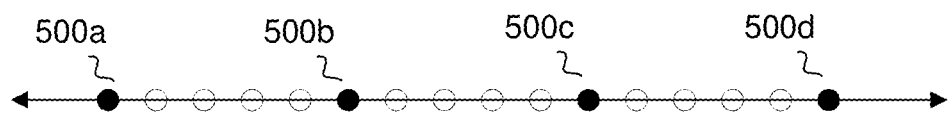
FIG. 5A illustrates keyframes used in hierarchical training, according to particular embodiments.

We first train a NeRF model on the keyframes, which we sample equidistant from the multi-view image sequence at fixed intervals K. FIG. 5A illustrates keyframes used in hierarchical training, according to particular embodiments. Each circle corresponds to a frame in a video. The black circles represent the keyframes 500a-d used for training, and the white circles represent frames that are not selected for training during the initial training phase. Each frame 500a-d selected for training (e.g., the black circles) may be used in the manner described above, such as with reference to FIG. 3. In particular embodiments, every pixel within a selected frame is used to train NeRF 200 and the latent codes 211. In other embodiments, only certain pixels within a selected frame are used. Such pixels may be selected based on the importance sampling technique described above.

Figure 5B:
FIG. 5B illustrates the full sequence of frames used in hierarchical training, according to particular embodiments.

After the model (e.g., NeRF 200 and the latent codes 211) converges based on the keyframes 500a-d, the pre-trained model may be used to initialize the final model to have the same temporal resolution of the full video. FIG. 5B illustrates the full sequence of frames used in hierarchical training, according to particular embodiments. In FIG. 5B, all the frames in the video are selected for training (i.e., all the circles are black). Alternatively, less than all the frames may be selected for training (e.g., only 80% or 90% of all the frames are selected). In particular embodiments, each selected frame may be assigned a fine-level latent code z 211. Since the per-frame motion of the scene within each segment (divided by neighboring keyframes) is smooth, particular embodiments may initialize the fine-level latent codes by linearly interpolating between the coarse latent codes of the keyframes 500a-d. For example, after pre-training, each of the keyframes 500a-d shown in black in FIG. 5A may have an updated latent code. The latent codes of the in-between frames shown in white in FIG. 5A may be initialized by interpolating the latent codes of the keyframes 500a-d. For example, the latent code of the first frame after 500a may be initialized based on an interpolation of the latent codes of keyframes 500a and 500b (e.g., 80% of the latent code of keyframe 500a and 20% of the latent code of keyframe 500b). Finally, we train with data from all the selected frames jointly, further optimizing the network weights of NeRF 200 and the latent codes z 211. The keyframe models captured an approximation to the time-invariant information across the video, which also occupies a significant portion of the radiance fields at every frame. With a photo-realistically reconstructed keyframe model, the full-frame training only needs to further learn the time-variant information per frame. In particular embodiments, every pixel within a selected frame is used to train NeRF 200 and the latent codes 211. In other embodiments, only certain pixels within a selected frame are used. Such pixels may be selected based on the importance sampling technique described above.

Figure 6:
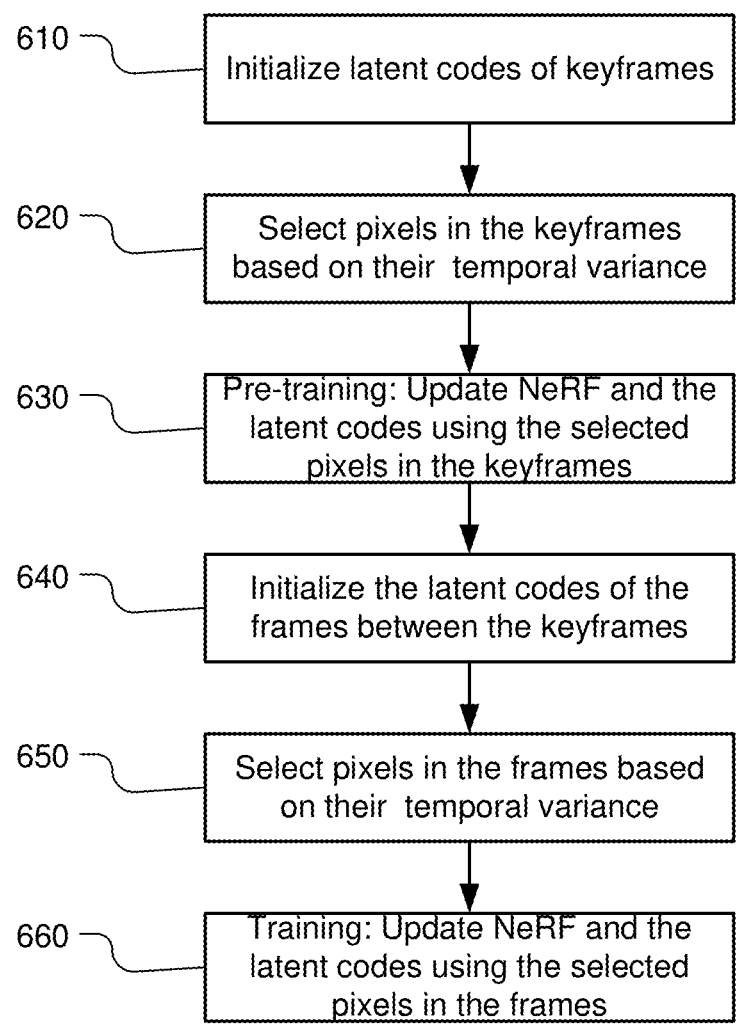
FIG. 6 illustrates a flow diagram for using hierarchical training and importance sampling, according to particular embodiments.

FIG. 6 illustrates a flow diagram for using hierarchical training and importance sampling, according to particular embodiments. The method 600 may firstly use keyframes within a video to pre-train NeRF and update the latent codes for the keyframes, followed by full training based on all or a larger subset of the frames in the video. For example, the method may begin at step 610, where the latent codes of a set of keyframes in a video are initialized. For example, the latent codes may be randomly initialized. At step 620, the pixels in the keyframes may be selected based on their respective temporal variance values. Techniques for computing the temporal variance values (e.g., the aforementioned importance weights) are described above. At step 630, the selected pixels in the keyframes may be used in a pre-training process to update NeRF and the latent codes of the keyframes. At step 640 after the pre-training process concludes, the latent codes of the frames between the keyframes may be initialized. In particular embodiments, the latent codes of the non-keyframes may be initialized based on an interpolation of the latent codes of the neighboring keyframes. At step 650, the pixels in the frames may be selected based on their respective temporal variance. Then at step 660, the selected pixels in the frames may be used to update NeRF and the latent codes of the frames. Details on how the selected pixels of a frame/keyframe are used to train and update NeRF and the latent codes are described with reference to FIG. 7.

Figure 7:
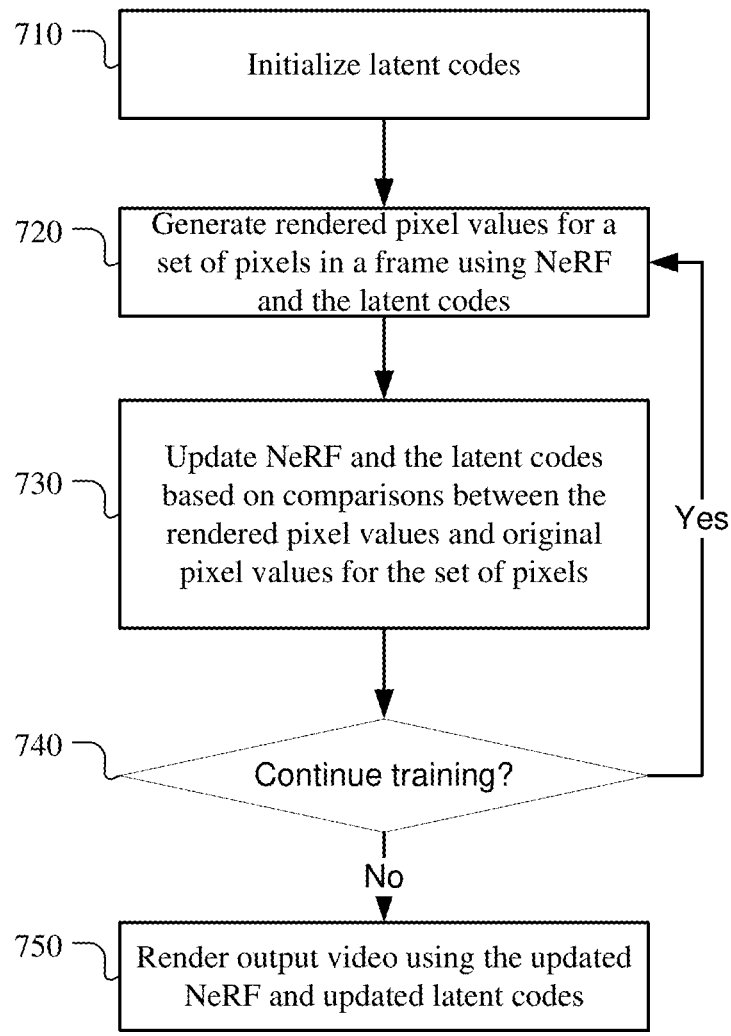
FIG. 7 illustrates a flow diagram for training and using a spatial-temporal NeRF, conditioned on latent codes, that represents both the special and temporal domains of a dynamic scene, according to particular embodiments.

FIG. 7 illustrates a flow diagram for training and using a spatial-temporal NeRF, conditioned on latent codes, that represents both the special and temporal domains of a dynamic scene, according to particular embodiments. The method 700 may begin at step 710, where a computing system may initialize the latent codes respectively associated with times associated with frames in a training video of a scene captured by a camera. Then, for each of the frames, the computing system may use it to update NeRF and the latent codes. For example, at step 720, the computing system may generate rendered pixel values for a set of pixels in the frame by querying NeRF using the latent code associated with the frame, a camera viewpoint associated with the frame, and ray directions associated with the set of pixels. At step 730, the computing system may update the latent code associated with the frame and the NeRF based on comparisons between the rendered pixel values and original pixel values for the set of pixels. At step 740, the computing system may determine whether to continue training. The process described above may continue until each frame selected for training has been used (e.g., the keyframes selected during the pre-training process or all the frames during the full training process) or until NeRF and the latent codes converge (e.g., the loss is below a predetermined threshold). If training is to continue, the process may repeat, starting at step 720. If training is complete, NeRF may be used at inference/runtime. For example, at step 750 after training completes, the computing system may render output frames for an output video of the scene. Each output frame may be rendered by querying the updated NeRF using one of the updated latent codes corresponding to a desired time associated with the output frame, a desired viewpoint for the output frame, and ray directions associated with pixels in the output frame.

We have proposed a novel neural 3D video synthesis approach that is able to represent real-world multi-view video recordings of dynamic scenes in a compact, yet expressive representation. Our model-free representation enables both high-quality view synthesis as well as motion interpolation. At the core of our approach is an efficient algorithm to learn dynamic latent-conditioned neural radiance fields that significantly boosts training speed, leads to fast convergence, and enable high-quality results. We see our approach as a first step forward in efficiently training dynamic neural radiance fields and hope that it will inspire follow-up work in the exciting and emerging field of neural scene representations.

Figure 8:
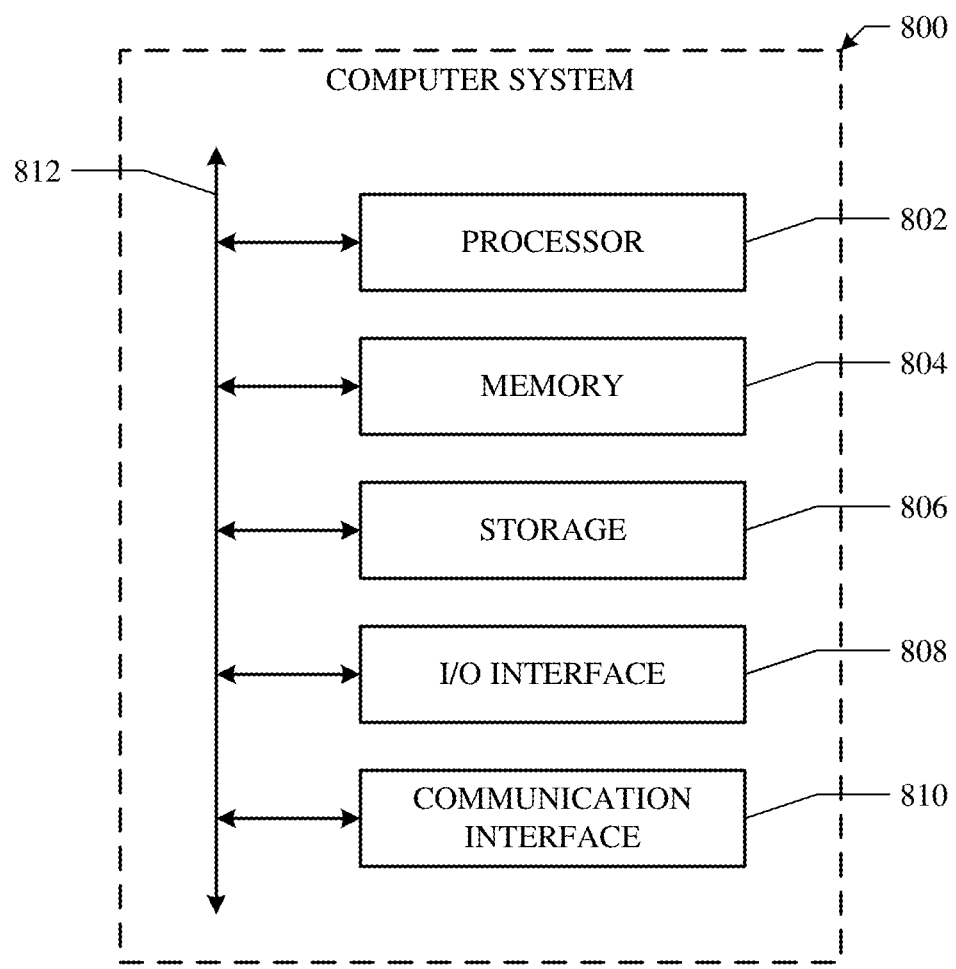
FIG. 8 illustrates an example computer system that may be used to perform the embodiments described herein.

FIG. 8 illustrates an example computer system 800. In particular embodiments, one or more computer systems 800 perform one or more steps of one or more methods described or illustrated herein. In particular embodiments, one or more computer systems 800 provide the functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising:
   rendering output frames for an output video of a scene, wherein each output frame is rendered by querying an updated neural radiance field (NeRF) using at least one updated latent code respectively associated with a desired time associated with the output frame, a desired viewpoint for the output frame, and ray directions associated with pixels in the output frame, wherein the updated NeRF and the at least one updated latent code are based on:
   a set of pixels selected from a plurality of pixels of at least two frames in a training video for the scene captured by a camera, the set of pixels selected based on temporal variances of the plurality of pixels,
   rendered pixel values for the set of pixels that were identified by querying a pre-trained NeRF using:
   ray directions associated with the set of pixels,
   initialized latent codes respectively associated with times associated with the at least two frames in the training video, and
   a first camera viewpoint associated with the at least two frames; and
   a comparison between the rendered pixel values and original pixel values for the set of pixels.

2. The method of claim 1, wherein the updated NeRF and the at least one updated latent code are further based on:
   a second training video of the scene captured by a second camera having a second camera viewpoint different from the first camera viewpoint, wherein the second training video and the training video are captured concurrently.

3. The method of claim 2, wherein a first frame of the at least two frames in the training video and a second frame in the second training video are both associated with a particular time and used for updating the latent code respectively associated with the particular time.

4. The method of claim 1, wherein the desired viewpoint for the output frame is different from any camera viewpoint associated with any frame of the at least two frames in the training video.

5. The method of claim 1, wherein each of the initialized latent codes consists of a predetermined number of values.

6. The method of claim 1, further comprising:
rendering, for the output video, an additional output frame associated with an additional desired time that is temporally between two adjacent frames of the frames in the training video, wherein the additional output frame is rendered by querying the updated NeRF using an interpolated latent code generated by interpolating updated latent codes respectively associated with the two adjacent frames.

7. The method of claim 1, wherein the temporal variances are used to determine probabilities of the corresponding pixels in the plurality of pixels being selected into the set of pixels used for updating the NeRF and the at least one updated latent code.

8. The method of claim 1, wherein the at least two frames of the training video used for the updated NeRF and the at least one updated latent code are keyframes within a larger set of frames of the training video, and the keyframes were selected from the larger set of frames based on positions of the keyframes in the larger set of frames.

9. The method of claim 8, wherein the positions of the keyframes in the larger set of frames are equally spaced by a predetermined number of frames.

10. The method of claim 8,
wherein the updated NeRF and the updated at least one latent code are further based on using additional frames in the larger set of frames in between the keyframes.

11. One or more computer-readable non-transitory storage media storing instructions, which, when executed by a system that includes an apparatus and one or more processors, causes the one or more processors to perform a set of operations, including:
rendering output frames for an output video of a scene, wherein each output frame is rendered by querying an updated neural radiance field (NeRF) using at least one updated latent code respectively associated with a desired time associated with the output frame, a desired viewpoint for the output frame, and ray directions associated with pixels in the output frame, wherein the updated NeRF and the at least one updated latent code are based on:
a set of pixels selected from a plurality of pixels of at least two frames in a training video for the scene captured by a camera, the set of pixels selected based on temporal variances of the plurality of pixels,
rendered pixel values for the set of pixels that were identified by querying a pre-trained NeRF using:
ray directions associated with the set of pixels,
initialized latent codes respectively associated with times associated with the at least two frames in the training video, and
a first camera viewpoint associated with the at least two frames; and
a comparison between the rendered pixel values and original pixel values for the set of pixels.

12. The one or more computer-readable non-transitory storage media of claim 11, further storing instructions for:
rendering, for the output video, an additional output frame associated with an additional desired time that is temporally between two adjacent frames of the frames in the training video, wherein the additional output frame is rendered by querying the updated NeRF using an interpolated latent code generated by interpolating updated latent codes respectively associated with the two adjacent frames.

13. The one or more computer-readable non-transitory storage media of claim 11, wherein the at least two frames of the training video used for the updated NeRF and the at least one updated latent code are keyframes within a larger set of frames of the training video, and
the keyframes were selected from the larger set of frames based on positions of the keyframes in the larger set of frames.

14. The one or more computer-readable non-transitory storage media of claim 13,
wherein the updated NeRF and the at least one updated latent code are further based on using additional frames in the larger set of frames in between the keyframes.

15. A system comprising:
one or more processors; and
one or more computer-readable non-transitory storage media coupled to one or more of the processors and comprising instructions operable when executed by one or more of the processors to cause the system to:
render output frames for an output video of a scene, wherein each output frame is rendered by querying an updated neural radiance field (NeRF) using at least one of the updated latent code respectively associated with a desired time associated with the output frame, a desired viewpoint for the output frame, and ray directions associated with pixels in the output frame, wherein the updated NeRF and the at least one updated latent code are based on:
a set of pixels selected from a plurality of pixels of at least two frames in a training video for the scene captured by a camera, the set of pixels selected based on temporal variances of the plurality of pixels,
rendered pixel values for the set of pixels that were identified by querying a pre-trained NeRF using:
ray directions associated with the set of pixels,
initialized latent codes respectively associated with times associated with the at least two frames in the training video, and
a first camera viewpoint associated with the at least two frames; and
a comparison between the rendered pixel values and original pixel values for the set of pixels.

16. The system of claim 15, wherein one or more of the processors are further operable when executing the instructions to:
render, for the output video, an additional output frame associated with an additional desired time that is temporally between two adjacent frames of the frames in the training video, wherein the additional output frame is rendered by querying the updated NeRF using an interpolated latent code generated by interpolating updated latent codes respectively associated with the two adjacent frames.

17. The system of claim 15, wherein the at least two frames of the training video used for the updated NeRF and the at least one updated latent code are keyframes within a larger set of frames of the training video, and
the keyframes were selected from the larger set of frames based on positions of the keyframes in the larger set of frames.

* * * * *